United States Patent Office 3,472,229
Patented Oct. 14, 1969

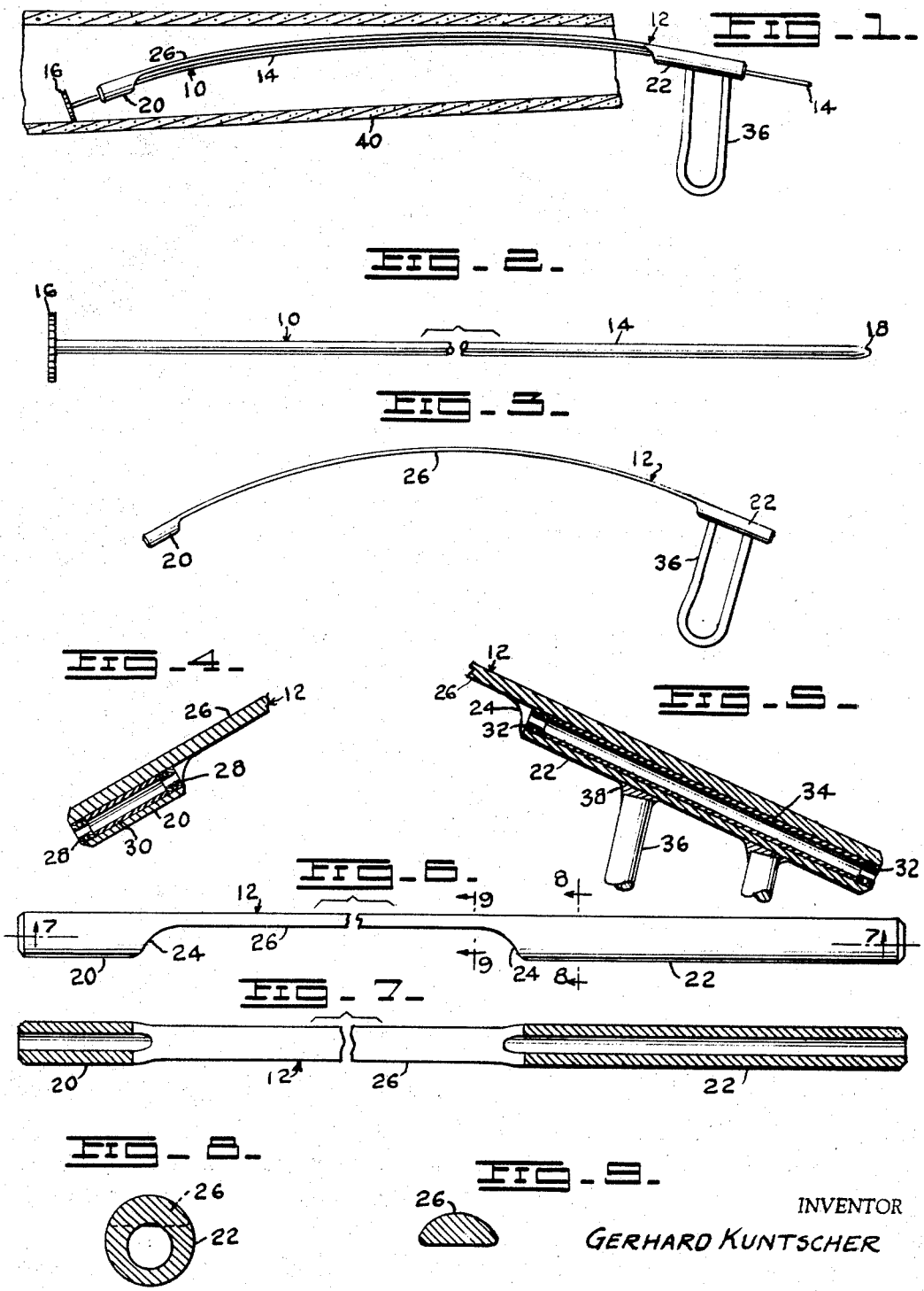

3,472,229
INSTRUMENT AND METHOD FOR CUTTING OR SEVERING A BONE FROM THE INSIDE THEREOF
Gerhard Kuntscher, Flensburg, Germany, assignor to Orthopedic Equipment Company, Inc., Bourbon, Ind., a corporation of Indiana
Filed June 15, 1967, Ser. No. 646,302
Int. Cl. A61b 17/14, 17/32; B26d 3/16
U.S. Cl. 128—317         8 Claims

ABSTRACT OF THE DISCLOSURE

A surgical circular saw having an elongated flexible shank or drive shaft is supported for rotation in an elongated support, and the saw and its associated elements are inserted into the patient's bone through the reamed-out medullary canal; the saw is rotated on its own axis and the entire device bodily rotated about the bone axis as the sawing action takes place, to cut around the bone from the inside, all without the necessity of making an incision at the point of cutting.

Cross reference to related applications

The present invention is an improvement over the disclosure of by abandoned copending application, Ser. No. 348,406, filed Mar. 2, 1964.

Background of the invention

It has been the common practice in surgery, where it is necessary to saw or break through a bone, as for example the femur, to saw the bone from the outside thereof. This procedure involves the danger of infection, shock, a high loss of blood, and injury to blood vessels, nerves or tendons. To avoid these dangers, there is shown in my copending application referred to, an entirely different method, namely, the inserting of a cutting tool through the reamed-out marrow cavity, and applying the tool against the inner wall of the bone to cut the latter. The instrument is important for use in re-aligning a fractured leg, for example, which has healed with mis-alignment, as well as for correction of a rotation fracture, excess bone length, etc.

In my copending application referred to, a casing is provided with a saw shaft extending therethrough and having a rotary saw beyond one end of the casing, which end of the casing is insertable through a suitable (remote) incision into the medullary canal. The casing is rigid and is provided with means engaging against one wall of the canal to provide a reaction force to engage the saw with the bone at the opposite side of the canal to render it effective for cutting therethrough. The device is bodily slowly rotated as the cutting action progresses, so that a cut may be made through the bone entirely therearound, or as desired.

Summary of the invention

In the present embodiment, the rigid casing of the prior construction is eliminated in favor of a thin support bow having saw-spindle bearings at its ends, the support being arcuate between such ends to facilitate the application of manual force to engage the saw with the bone during the cutting operation. The saw spindle is thin and flexible and extends through the bearing remote from the saw for connection to a suitable chuck which is motor driven to rotate the saw. The bearing last referred to will normally be external to the patient's body and it is provided with a handle whereby the bodily rotation of the instrument as a whole may be effected so that the cutting action of the saw may slowly progress around the bone. Thus, the cutting of the tissues at the site of the sawing action, together with its accompanying disadvantages, is eliminated, and accordingly healing progresses quite rapidly. The whole operation is preferably carried out under fluoroscopic inspection at the cutting site.

Brief description of the drawings

FIGURE 1 is a longitudinal sectional view of a bone in which the medullary canal has been reamed out, the instrument of the present invention being shown in side elevation;

FIGURE 2 is a side elevation of the cutting unit, substantially enlarged, including the circular saw and its flexible driving spindle;

FIGURE 3 is a side elevation of the bowed spindle support;

FIGURE 4 is an enlarged axial sectional view of the distal bearing of the support, adjacent which the circular saw will be positioned;

FIGURE 5 is a similar view of the bearing at the other end of the support;

FIGURE 6 is a side elevation of the support, a portion being broken away, and showing the support in its initially manufactured form, before being given its final arcuate shape;

FIGURE 7 is a section on line 7—7 of FIGURE 6;

FIGURE 8 is a section on line 8—8 of FIGURE 6; and

FIGURE 9 is a similar view on line 9—9 of FIGURE 6.

Description of the preferred embodiment

Referring to the drawing, the instrument comprises two main units, namely, a cutting unit indicated as a whole by the numeral 10 and a support unit indicated as a whole by the numeral 12. The cutting unit comprises an elongated metal, preferably steel, spindle 14 which possesses an appreciable degree of flexibility. A circular saw 16 is carried by one end of the spindle 14, and the opposite end of this spindle is tapered or rounded to decrease in size to its extremity as at 18 for a purpose to be described.

The support 12 is preferably formed integrally and is provided at its ends with bearing housings 20 and 22. At the inner ends of the bearing housings, the support is cut away as at 24 (FIGS. 5 and 6), thus providing a relatively thin, narrow and eccentric connecting shank 26 between the bearing housings. This shank is also preferably resilient and is initially formed straight as shown in FIGURE 6, after which it is permanently bent to its final normal (unstressed) curvature as shown in FIGURE 3. The bearing housing 20 is provided with miniature ball bearings 28 at its ends and between these bearings is arranged a spacer sleeve 30. Similarly, the bearing housing 22 is provided at its ends with ball bearings 32 and a spacer sleeve 34 is arranged therebetween. The bearing housing 22 is provided with a handle 36 secured thereto in any suitable manner, for example, by silver solder 38 (FIGURE 5).

In FIGURE 1 the instrument is shown as projecting into the medullary canal of a bone 40, which may be the femur or any other bone in which the use of the instrument is indicated. An incision is made of the type with which medullary nailing is practiced, and the medullary canal is suitably reamed out to provide for the insertion of the present instrument. The cutting unit of FIGURE 2 is first inserted alone into the canal to the desired position, whereupon the reduced end 18 of the flexible spindle 14 has threaded over it the bearing housing 20 and then (as the holder 12 advances to the FIG. 1 position), the bearing housing 22 is also threaded over the spindle end 18. The spindle 14 being normally straight, resists to some extent its being flexed to follow the curvature of the connecting portion 26 of the support, thus causing the curvature of the latter to flatten somewhat as shown in FIGURE 1.

The insertion of the saw of course takes place under X-ray inspection to insure cutting at the proper point. The free end of the spindle 14 is inserted in a motor chuck of a conventional surgical power unit or the like, and with the saw 16 positioned at the proper point, the saw is rotated by the power unit through the spindle 14. The surgeon will hold the handle 36 and thereby exert an angling force on the saw 16 to urge it in a downward direction as viewed in FIGURE 1 to initiate the sawing operation. As the sawing progresses, the surgeon will gradually turn the handle 16 around the axis of the medullary canal, thus causing the sawing action to progress around the inside of the bone until the latter has been completely or partially severed, depending upon the surgical procedure to followed. In some cases the shank 26 may bear against the side of the medullary canal opposite the saw and resiliently help to maintain the latter under pressure against the bone to effect the sawing operation.

It will be apparent that the surgeon may accurately apply sawing pressure against the bone and accurately rotate the entire instrument as sawing progresses, to complete the sawing operation. When the sawing of the bone has been completed, the motor is stopped and the chuck removed from the spindle 14. The supporting unit then may be withdrawn by pulling on the handle 36, the bearings sliding along the spindle 14. The cutting unit 10 is then free to be withdrawn from the canal, having resumed its straight condition.

The present instrument is highly effective for performing intramedullary osteotomies, the nature of the device providing perfect manual control of the cutting operation by the surgeon at all times. The instrument eliminates the cutting of tissues at the site of the cutting operation, thus preventing damage to tissues, vessels and nerves around the site of the operation. The use of the instrument is thus less painful and less traumatic and healing takes place relatively rapidly under these conditions. The simplicity of the design obviously facilitates sterilization procedures, and the thinness of the inserted parts allows use of the technique in very narrow canals.

What is claimed is:

1. A surgical instrument for cutting a bone from the inside thereof comprising a rotary cutting element having an elongated flexible spindle adapted for insertion into the medullary canal, an elongated bearing support for said spindle from which the end of said spindle opposite said cutting element projects for connection with a power source for rotating said spindle and cutting element, said bearing support being bowed intermediate its ends whereby an angling force applied to said bearing support externally of the patient will deflect said cutting element into engagement with the bone to cut thereinto, said bearing support being bodily rotatable about the bone axis to cause the cutting action to progress around the bone.

2. An instrument according to claim 1 wherein said bearing support at the end opposite said cutting element has a handle projecting laterally therefrom to apply such force to hold said cutting element in engagement with the bone and for bodily rotating said bearing support.

3. An instrument according to claim 1 wherein said bearing support comprises bearings at the ends thereof and a reduced eccentric shank connecting said bearings and constituting the bowed intermediate portion of said bearing support.

4. An instrument according to claim 1 wherein said bearing support comprises bearings at the ends thereof and a reduced eccentric shank connecting said bearings and constituting the bowed intermediate portion of said bearing support, the bearing remote from said cutting element having a handle projecting laterally therefrom to allow the operator to apply force to hold said cutting element in engagement with the bone and for bodily rotating said bearing support.

5. An instrument according to claim 1 wherein said bearing support comprises bearings at the ends thereof and a reduced resilient shank connecting said bearings and constituting the intermediate portion of said bearing support, said shank being curved substantially throughout its length whereby said bearings are angled with respect to each other, the flexibility of said spindle adapting it for projection through said bearings.

6. An instrument according to claim 1 wherein said bearing support comprises bearings at the ends thereof and a reduced shank connecting said bearings and constituting the intermediate portion of said bearing support, the extremity of said spindle opposite said cutting element being reduced in size whereby said cutting element may be first inserted into the bone followed by the sliding successively of said bearings on said spindle over said reduced end thereof.

7. The method of performing an intramedullary osteotomy with an instrument comprising a rotary saw having a flexible spindle mounted in an elongated bowed bearing support having connected longitudinally spaced bearings, which comprises reaming the medullary canal, inserting the instrument into the canal from a point spaced from the site of cutting, exerting an angling force upon the bearing remote from said saw to apply resilient pressure on the latter against the inner wall of the bone, and rotating said remote bearing to effect the cutting action circumferentially around the axis of the canal.

8. The method of performing intramedullary osteotomy with an instrument comprising a rotary saw having a flexible spindle the end of which remote from said saw is tapered to be reduced in size and wherein said spindle is adapted to be mounted in a bearing support having connecting longitudinally spaced spindle bearings, which comprises inserting the saw into the medullary canal from a point spaced from the site of cutting, sliding the bearings of said bearing support successively over the reduced end of said spindle until one of said bearings is adjacent said saw, exerting an angling force against the end of the instrument remote from said saw to apply resilient pressure on the latter against the bone, and rotating said remote end of the instrument to effect the cutting action circumferentially around the medullary canal.

References Cited

UNITED STATES PATENTS 2,702,550   2/1955   Rowe _____ 128—317

OTHER REFERENCES

Wilson, P. D., Journal of Bone and Joint Surgery, October 1965, pp. 1428–1429.

L. W. TRAPP, Primary Examiner

U.S. Cl. X.R.

30—103; 128—305